(12) United States Patent
Ur et al.

(10) Patent No.: US 9,298,931 B2
(45) Date of Patent: Mar. 29, 2016

(54) DIGITAL MEDIA PRIVACY PROTECTION

(75) Inventors: Shmuel Ur, Shorashim, IL (US); Mordehai Margalit, Zichron Ya'akov (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/882,491

(22) PCT Filed: Aug. 15, 2012

(86) PCT No.: PCT/US2012/050894
§ 371 (c)(1),
(2), (4) Date: Apr. 29, 2013

(87) PCT Pub. No.: WO2014/028009
PCT Pub. Date: Feb. 20, 2014

(65) Prior Publication Data
US 2014/0196152 A1    Jul. 10, 2014

(51) Int. Cl.
*G06F 21/62* (2013.01)
*G06F 21/60* (2013.01)
*G06F 21/00* (2013.01)
*G06F 21/32* (2013.01)

(52) U.S. Cl.
CPC .............. *G06F 21/60* (2013.01); *G06F 21/00* (2013.01); *G06F 21/32* (2013.01); *G06F 21/6245* (2013.01); *G06F 21/6254* (2013.01)

(58) Field of Classification Search
None
See application file for complete search history.

(56) References Cited

U.S. PATENT DOCUMENTS

| | | | |
|---|---|---|---|
| 7,440,594 B2 | 10/2008 | Takenaka | |
| 7,610,629 B2 | 10/2009 | Fukuda et al. | |
| 8,744,143 B2 * | 6/2014 | Chen | 382/118 |
| 2006/0238380 A1 | 10/2006 | Kimchi et al. | |
| 2007/0116328 A1 | 5/2007 | Sablak et al. | |
| 2007/0153091 A1 | 7/2007 | Watlington et al. | |
| 2009/0276825 A1 * | 11/2009 | Hatakeyama et al. | 726/1 |
| 2009/0313254 A1 * | 12/2009 | Mattox et al. | 707/9 |
| 2010/0296705 A1 | 11/2010 | Miksa et al. | |
| 2011/0123068 A1 | 5/2011 | Miksa et al. | |
| 2011/0202968 A1 | 8/2011 | Nurmi | |

FOREIGN PATENT DOCUMENTS

WO    20101063880 A1    6/2010

OTHER PUBLICATIONS

International Search Report from International Application No. PCT/US12/50894, mailed Nov. 20, 2012.
ObscuraCam—Android Apps on Google Play, Apr. 12, 2012, 2pgs.
(Continued)

*Primary Examiner* — Minh Dinh
*Assistant Examiner* — Wayne An
(74) *Attorney, Agent, or Firm* — Brundidge & Stanger, P.C.

(57) ABSTRACT

In one example of digital media privacy protection, a computer-readable medium stores computer-executable instructions that, when executed, cause one or more processors to execute operations including capturing at least one image file, obfuscating at least all facial images included in the captured image file, comparing all facial images included in the captured image file against a locally stored privacy policy, unobfuscating those of the facial images included in the captured image file for which the comparison against the locally stored privacy policy results in a positive match, and rendering the captured image file.

16 Claims, 6 Drawing Sheets

(56) References Cited

OTHER PUBLICATIONS

ObscuraCam—Android Apps on Google Play, Apr. 7, 2012, 2pgs.
"Stealth Vision for Protecting Privacy" by Itaru Kitahara, et al., 2005.
"An Architecture for Privacy-Sensitive Ubiquitous Computing" Jason I-An Hong., 2005.
IEEE Xplore, "How Much Room Before You Rely: Balancing Privacy Control and Fidelity in the Location-Based Pervasive Applications", Abstract 2008.
"Access control list," accessed at https://web.archive.org/web/20120811091522/https://en.wikipedia.org/wiki/Access_control_list, last modified on Jul. 11, 2012, pp. 1-4.
"Google Maps Street View," accessed at https://web.archive.org/web/20120626014140/http://maps.google.com/intl/en_us/help/maps/streetview/privacy.html, accessed on Sep. 23, 2014, pp. 1-3.
"ObscuraCam: Secure Smart Camera," The Guardian Project, accessed at https://web.archive.org/web/20120814082327/https://guardianproject.info/apps/obscuracam/, accessed on Sep. 23, 2014, pp. 1-4.
Frome, A., et al., "Large-scale Privacy Protection in Google Street View," in Proc. ICCV, pp. 2373-2380 (2009).
"Face Recognition and Privacy," accessed at http://web.archive.org/web/20120829200007/http://tagmenot.info/content/face-recognition-and-privacy, Aug. 29, 2012, 4 pages.
"What is TagMeNot?," accessed at http://web.archive.org/web/20120817034457/http://tagmenotinfo/, Aug. 17, 2012, 2 pages.
Teixeira, T., et al., "Tasking Networked CCTV Cameras and Mobile Phones to Identify and Localize Multiple People," Proceedings of the 12th ACM international conference on Ubiquitous computing, pp. 213-222 (Sep. 26, 2010).

* cited by examiner

DIGITAL MEDIA PRIVACY PROTECTION

CROSS-REFERENCE TO RELATED APPLICATION

The present application is the U.S. national phase application under 35 U.S.C §371 of International application No. PCT/US12/50894, filed on Aug. 15, 2012, the entirety of which is incorporated herein by reference.

TECHNICAL FIELD

The implementations and embodiments described herein pertain generally to protecting the privacy of individuals amidst ubiquitous digital media venues.

BACKGROUND

Presently, there is an increasing number of online, and even offline, venues in which pictures and video feeds may be published, often in real-time. With cloud-computing resources, including social media services, providing the infrastructure support for this surge in spontaneous publishing of digital media, the potential for an individual to have his/her image published in a public venue increases with regularity, often with limited opportunities to protect his/her own privacy.

SUMMARY

In one example embodiment, a computer-readable medium stores computer-executable instructions that, when executed, cause one or more processors to execute operations including capturing at least one image file, obfuscating at least all facial images included in the captured image file, comparing all facial images included in the captured image file against a locally stored privacy policy, unobfuscating those of the facial images included in the captured image file for which the comparison against the locally stored privacy policy results in a positive match, and rendering the captured image file.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
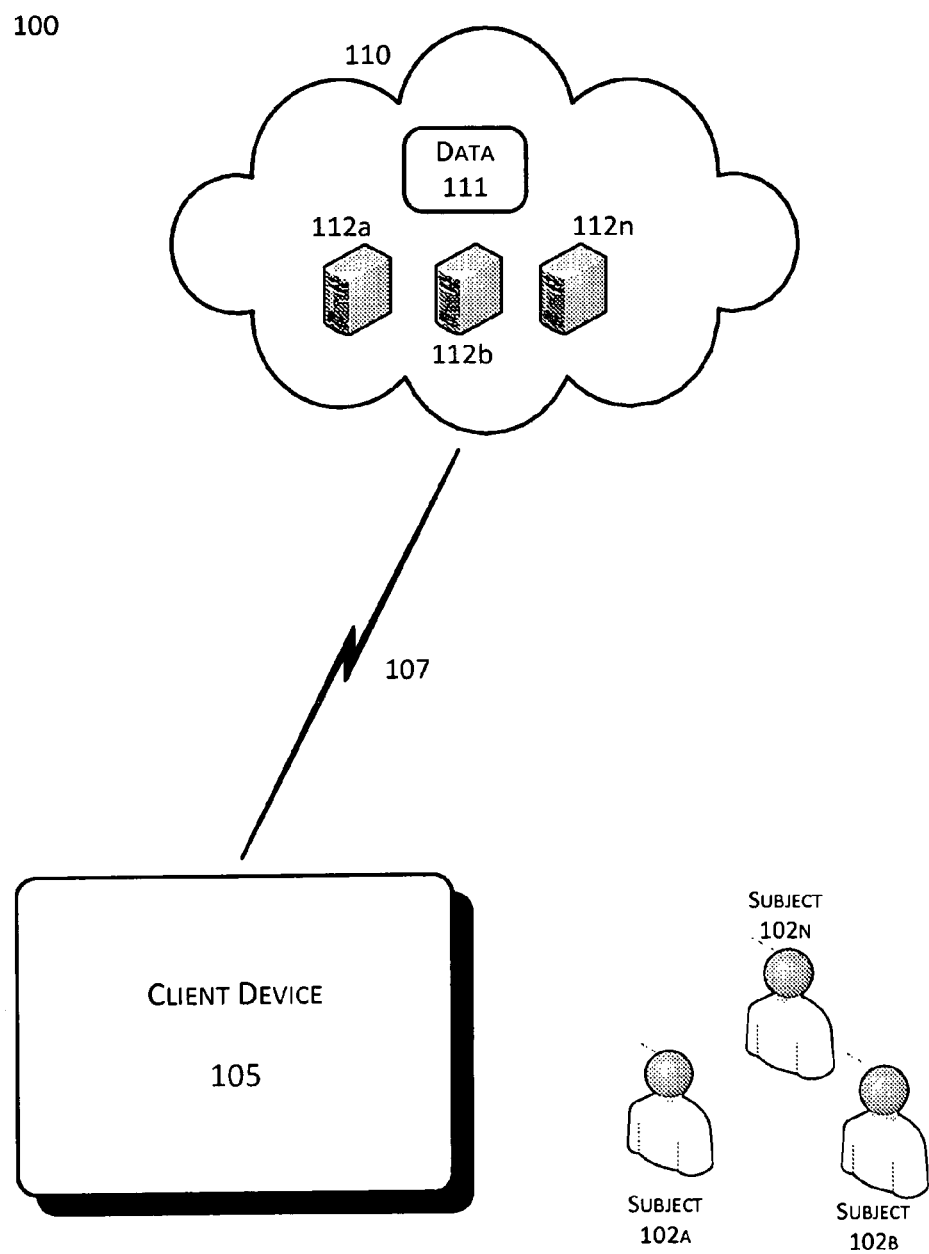
FIG. 1 shows an example system configuration in which digital media privacy protection may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows an example system configuration 100 in which digital media privacy protection may be implemented, arranged in accordance with at least some embodiments described herein. As depicted, configuration 100 may include a client device 105; digital media subjects 102a, 102b, . . . , 102n; and a cloud-based service/data provider 110. Further, a communication link 107 may refer to a communication link enabled by a protocol utilized to transmit data and/or information between a client device 105 and service/data provider 110.

Subjects 102a, 102b, . . . , 102n may refer to persons of whom digital media images potentially may be captured by client device 105, and for whose privacy is sought to be protected by the embodiments of digital media privacy protection described herein. Unless otherwise stated herein, reference to subjects 102a, 102b, . . . , and 102n may hereafter be substituted by a collective reference to "subjects 102." Regardless, in a broad sense, subjects 102 may refer to the general public. On a more practical level, subjects 102 may refer to acquaintances, friends, family members, or other people known by or in the vicinity of the entity that owns or exercises control over client device 105. Such entity may be a person who owns or exercises control over, client device 105. Alternatively, such entity may be, e.g., a security company, a news agency, an independent news gatherer (i.e., a blogger), a store owner, etc. These examples are not intended to be limiting, but rather to illustrate the numerous possibilities for entities that may own and/or exercise control over client device 105.

Client device 105 may refer to any device with the capability to acquire, collect, and/or manipulate digital media files, including photographic images and/or videos. Examples of such devices include (but are not limited to) the following: camera-equipped smartphones, tablet computing devices, laptop computers, set-top boxes (i.e., gaming console) having a camera built-in or attached as an accessory, and non-laptop computer configurations, all of which may be connected to the aforementioned mobile communications network or, alternatively, to a wired network.

Client device 105 may be configured to send one or more photos, videos, or other forms of visual digital media captured or acquired thereby to cloud-based service/data provider 110.

Communications for client device 105 may be implemented by a wireless service provider (not shown), which may also be known as a mobile network carrier, wireless carrier, or even cellular company. Regardless of the alternate reference, the wireless service provider may provide services for mobile communications subscribers. Client device 105 may be configured to communicate with service/data provider 110, other such client devices whether or not such devices are subscribed to the services of the wireless service provider, and/or a third-party entity.

Service/data provider 110 may refer to a cloud-based storage and dissemination platform owned and/or operated by a third-party service provider. Service/data provider 110 may include a framework of hardware, software, firmware, or any combination thereof, to which, e.g., captured digital media files may be stored or from which one or more captured digital media files may be shared with subscribers to the hosted service. Thus, service/data provider 110 may be implemented as a telecommunications service provider and/or web-based storage and sharing service to which user of client device 105 registers prior to use. Such registration may include pre-configuration of user preferences or settings for sharing captured digital media files, text posts, purchasing applications for client device 105; soliciting or contributing data, information, and/or captured digital media files from or to service/data provider 110; etc. Accordingly, in an exemplary embodiment, service/data provider 110 may be a social networking service. Further, service/data provider 110 may relay data 111 including, at least, a privacy policy or a dynamic update to an, existing privacy policy by which digital media privacy protection may be implemented on client device 105.

Data 111, as set forth above, may include a privacy policy or a dynamic update to an existing privacy policy for implementing digital media privacy protection. Thus, data 111 may include a database, pertaining to subjects 102, of permissions regarding digital media files, e.g., photographs and/or videos, captured by client device 105. Therefore, data 111 may include a database of names of subjects 102, photographic and/or video images and corresponding names of subjects 102, and permissions (e.g., full, conditional, or denied) for one or more of subjects 102. The permission for each of subjects 102 may include one or more levels of authorization for that particular one of subjects 102 to allow at least a facial image of that subject to be included or otherwise identified in a photograph or video image captured by client device 105.

Alternatively, or in addition, data 111 may include a database, pertaining to various ones of subjects 102 from whom authorization has been granted to allow at least a facial image thereof to be included or otherwise identified in a photograph or video image captured by client device 105.

Regardless, data 111 stored at client device 105 and/or service/data provider 110 may be dynamic, and subject to change by submissions made by one or more of subjects 102, by client device 105, or by some other source (e.g., event organizer).

Servers 112a, 112b, . . . , and 112n may refer to servers hosted by or for service/data provider 110. More particularly, servers 112a, 112b, . . . , and 112n may be the access point at which data 111 may be received from one or more of subjects 102, client device 105, or some other source (e.g., event organizer), via communication link 107. Further, data 111 on one or more of servers 112 may be accessed by or transmitted to client device 105, via communication link 107. Unless otherwise stated herein, reference to servers 112a, 112b, . . . , and 112n may hereafter be substituted by a collective reference to "servers 112."

Communication link 107 may include any mobile communications technology, e.g., GSM, CDMA, etc., depending upon the technologies supported by particular wireless service providers to whose services client device 105 and service/data provider 110 may be assigned or subscribed. Further, the aforementioned communication link 107 may be implemented utilizing non-cellular technologies such as conventional analog AM or FM radio, Wi-Fi™, wireless local area network (WLAN or IEEE 802.11), Worldwide Interoperability for Microwave Access (WiMAX™), Bluetooth™, hard-wired connections, e.g., cable, phone lines, and other analog and digital wireless voice and data transmission technologies.

Thus, in FIG. 1, configuration 100 provides an example, though not exclusive, environment by which the privacy for each of myriad potential subjects of whom a digital image is captured by client device 105 may be protected.

Figure 2:
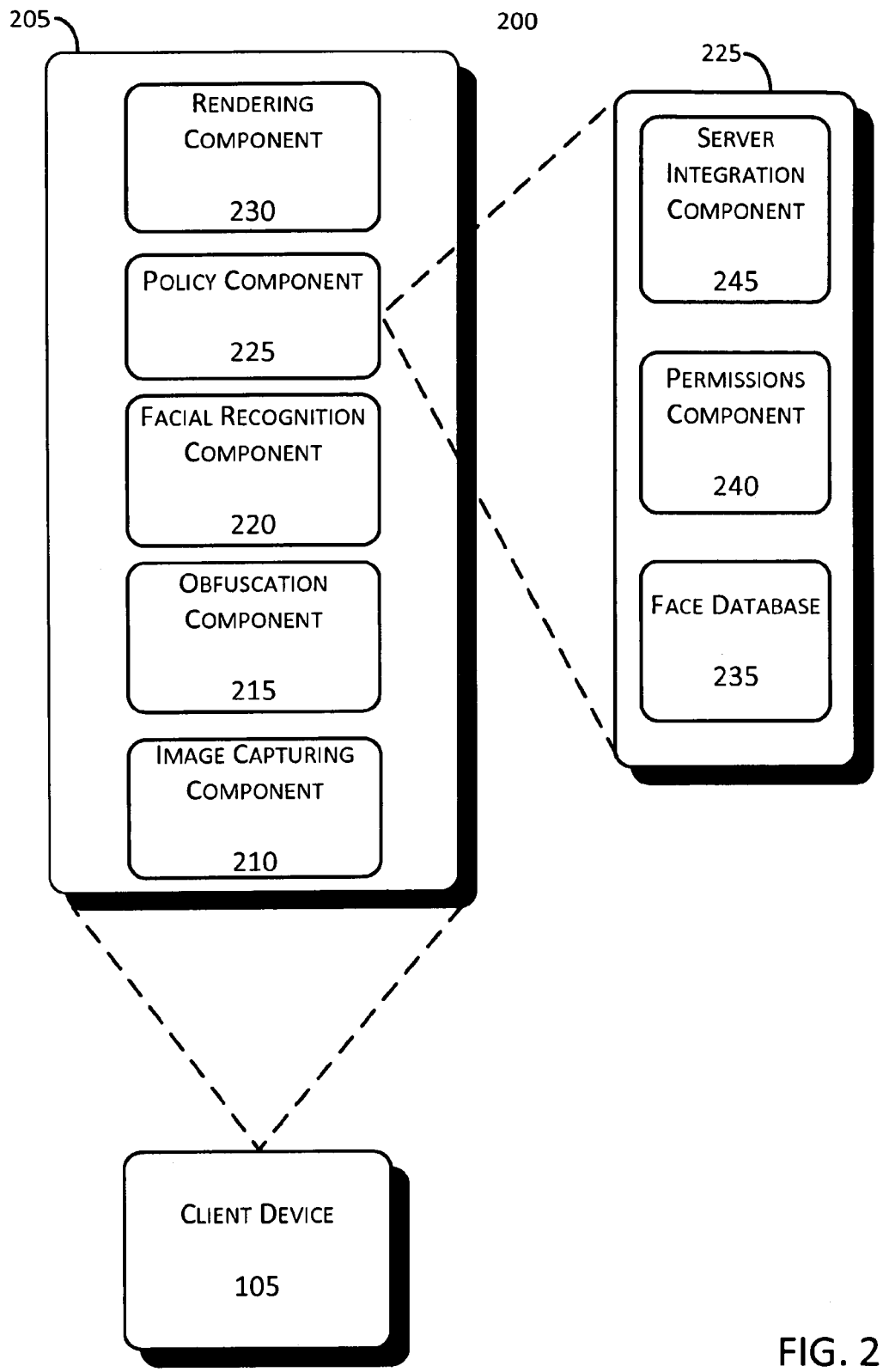
FIG. 2 shows an example configuration of a client device by which digital media privacy protection may be implemented, arranged in accordance with at least some embodiments described herein.

FIG. 2 shows an example configuration 200 of a client device by which digital media privacy protection may be implemented, arranged in accordance with at least some embodiments described herein. As depicted in FIG. 2, client device 105 may include an operating system (OS) configuration 205 of various components or modules, e.g., implemented by a framework of hardware, software, firmware, or any combination thereof. Such software and/or firmware may include one or more computer-readable media including but not limited to Application Specific Integrated Circuit (ASIC) or Customer Specific Integrated Circuit (CSIC). The various components or modules corresponding to OS configuration 205 may include, but are not limited to, an image capturing component 210, an obfuscation component 215, a facial recognition component 220, a policy component 225, and a rendering component 230. Further, OS configuration 205 is not limited to such components or modules, as obvious modifications may be made by adding further components or modules or even eliminating at least one of the components or modules described here or even by having various components or modules assuming roles accorded to other components or modules in the following description. As further depicted in FIG. 2, the various components or modules corresponding to policy component 225 may include, but are not limited to, a face database 235, a permissions component 240, and a server integration component 245.

Image capturing component 210 may refer to a framework of hardware, software, firmware, or any combination thereof, that is configured, designed, and/or programmed to capture digital media files, including photographs and/or video files. Thus, image capturing component 210 may be included in any device having the capability to acquire, collect, and/or manipulate digital media images and/or videos to implement some aspect of the techniques discussed herein. Accordingly, image capturing component 210 may be included in, though not exclusively: a smartphone, a tablet computing device, a laptop computer, a set-top box (i.e., gaming console or accessory), and non-laptop computer configurations, any of which may be connected to the aforementioned mobile communications network or, alternatively, to a wired network.

Obfuscation component 215 may refer to a component or module that is configured, designed, and/or programmed to obfuscate, or otherwise blur, at least all discernible facial images included in a digital media file captured by image capturing component 210. Such obfuscation may occur upon the capturing of a digital media file or upon review of a stored privacy policy. For the purposes of the embodiments described herein, a discernible facial image may be any facial image within a photograph or video image frame captured by image capturing component 210. Therefore, any facial image having discernible features may be obfuscated, or otherwise, blurred by obfuscation component 215.

Obfuscation, in accordance with the embodiments described herein, may utilize known blurring techniques. For example, but not as a limitation, discerned facial images may be targeted for Gaussian blurring, for application of known blurring tools or techniques, or for pixel manipulation. Other known and even foreseeable techniques may be utilized by the embodiments herein, and digital media privacy protection is not to be limited by implementation of the obfuscation or blurring tools and techniques utilized therefor.

In addition obfuscating, or otherwise blurring, all discernible facial images in a digital media file captured by image capturing component 210, obfuscation component 215 may further be trained, reconfigured, redesigned, and/or reprogrammed to further obfuscate, or otherwise further blur, other features found in a digital media file. Non-limiting examples of such features may include corporate logos, clothing brands or images, product placements, vulgar imagery, etc.

Facial recognition component 220 may refer to a framework of hardware, software, firmware, or any combination thereof, that is configured, designed, and/or programmed to discern any facial image within a digital media file, e.g., photograph or video image frame, captured by image capturing component 210 for comparison against facial images included in a locally stored database of facial images, i.e., data 111 as accessed by policy component 225. Facial recognition component 220 may recognize and compare the discernible facial images from the photograph or video image frame captured by image capturing component 210 before or in parallel with the obfuscation of the aforementioned photograph or video image frame by obfuscation component 215.

Policy component 225 may refer to a component or module that is configured, designed, and/or programmed to access data 111 stored at either client device 105 or service/data provider 110 to determine whether a facial image included in a particular photograph or video file that is discerned by facial recognition component 220 may be unobfuscated for any of the reasons pertaining to the privacy policy for the respective one of subjects 102 corresponding to the discerned facial image.

As set forth above, the various components or modules corresponding to policy component 225 may include, but are not limited to, face database 235, permissions component 240, and server integration component 245.

Face database 235 may refer to a compilation of digital media images, including photographs and video image frames, of one or more of subjects 102a, 102b, . . . , 102n, who have submitted full or conditional permission or who have denied permission to have their personal image, as captured by client device 105, rendered. The personal image, as applicable to the embodiments described herein, includes at least a facial image for the respective one of subjects 102. The permission for the respective one of subjects 102 may be modified to apply to other aspects of the subject's personal appearance, as may be captured by client device 105.

Permissions component 240 may refer to a component or module that is configured, designed, and/or programmed to access data 111, whether stored locally on client device 105 or on one of servers 112 on service/data provider 110.

For each of subjects 102 captured in a particular digital media file by client device 105, before or in parallel with obfuscation component 215 obfuscating all discernible facial images, the facial image discerned in the digital media, file by facial recognition component 220 and matched to a corresponding image in face database 235 may be compared to the permissions accessed by permissions component 240.

In accordance with various embodiments of digital media privacy protection, the accessed permissions granted by one or more of subjects 102 may be full, partial/conditional, or denied. By granting full permission, a respective one of subjects 102 may allow all corresponding digital media images captured by client device 105 to be stored, transferred, and/or shared with at least the facial image of the respective one of subjects 102 being unobfuscated, i.e., not blurred. However, facial images of one or more remaining subjects in a common digital media image may remain obscured or blurred, depending upon the corresponding permissions given.

By granting partial, contingent, or otherwise conditional permission, a respective one of subjects 102 may allow corresponding digital media images captured by client device 105 to be stored, transferred, and/or shared with the facial image of the respective one of subjects 102 being unobfuscated, i.e., not blurred, under certain circumstances. For instance, conditional permission may apply to, a particular geographic location, e.g., in a particular office setting, at a particular restaurant, at a particular sporting event, etc. In addition or as an alternative, conditional permission may further apply to particular time setting, e.g., on Christmas day, on February 14, next Saturday, etc. Further still, conditional permission may further apply to both location and time, e.g., during this year's association convention, on Christmas morning at your house, on February 14 at this restaurant, etc. Of course, there are many other permutations of time, location, and other variables that may be utilized to provide partial, contingent, or otherwise conditional permission for a respective one of subjects 102 to have respective facial images captured by client device 105 rendered, in accordance with various embodiments of digital media privacy protection described herein.

By denying permission, a respective one of subjects 102 may prevent any digital media image captured by client device 105 to be rendered, in accordance with various embodiments of digital media privacy protection described herein, without the facial image of the respective subject obfuscated or otherwise blurred.

Further, data 111 may be finite. That is, in some embodiments, data 111 is not capable of including permissions, whether full, conditional, or denied, of the entire general public, which is the entirety of potential subjects 102. Thus, by default, permission for rendering is denied for any subject whose facial image is captured by client device 105 in a digital media file and whose permission is not included in data 111 or is otherwise not accessible by permissions component 240.

Accordingly, the embodiments of digital media privacy protection are able to protect the privacy of, at least, unwitting, unwilling, and/or unaware subjects of digital media images or files captured by client device 105.

Server integration component 245 may refer to a component or module that is configured, designed, and/or programmed to access data 111, or any updates thereto, from service/data provider 110 by client device 105; and to provide updates to data 111, stored on service/data provider 110, from client device 105. That is, in accordance with various embodiments of digital media privacy protection described herein, the permissions accessed by permissions component 240 are dynamic in nature, and any one of the permissions, whether full, conditional, or denied, may be changed by a respective one of subjects 102 using a corresponding client device or by having client device 105 update the respective permission included in data 111.

Rendering component 230 may refer to a component or module that is configured, designed, and/or programmed to remove any restrictions configured to prevent a particular captured image from being stored locally on client device 105 and/or on servers 112 at service/data provider 110; remove any restrictions configured to prevent a particular captured image from being transmitted to another device or storage medium; and/or remove any restrictions configured to prevent a particular captured image from being uploaded to a cloud-based networking entity, e.g., a social networking service. More particularly, rendering component may render, as indicated above, a digital media image captured by client device 105, with an unobfuscated facial image for just those subjects 102 for whom permission has been granted, within the context therefore.

Thus, FIG. 2 shows example OS components of client device 105 that may be utilized in protecting privacy for subjects of digital media images and files, in accordance with various embodiments described herein.

Figure 3:
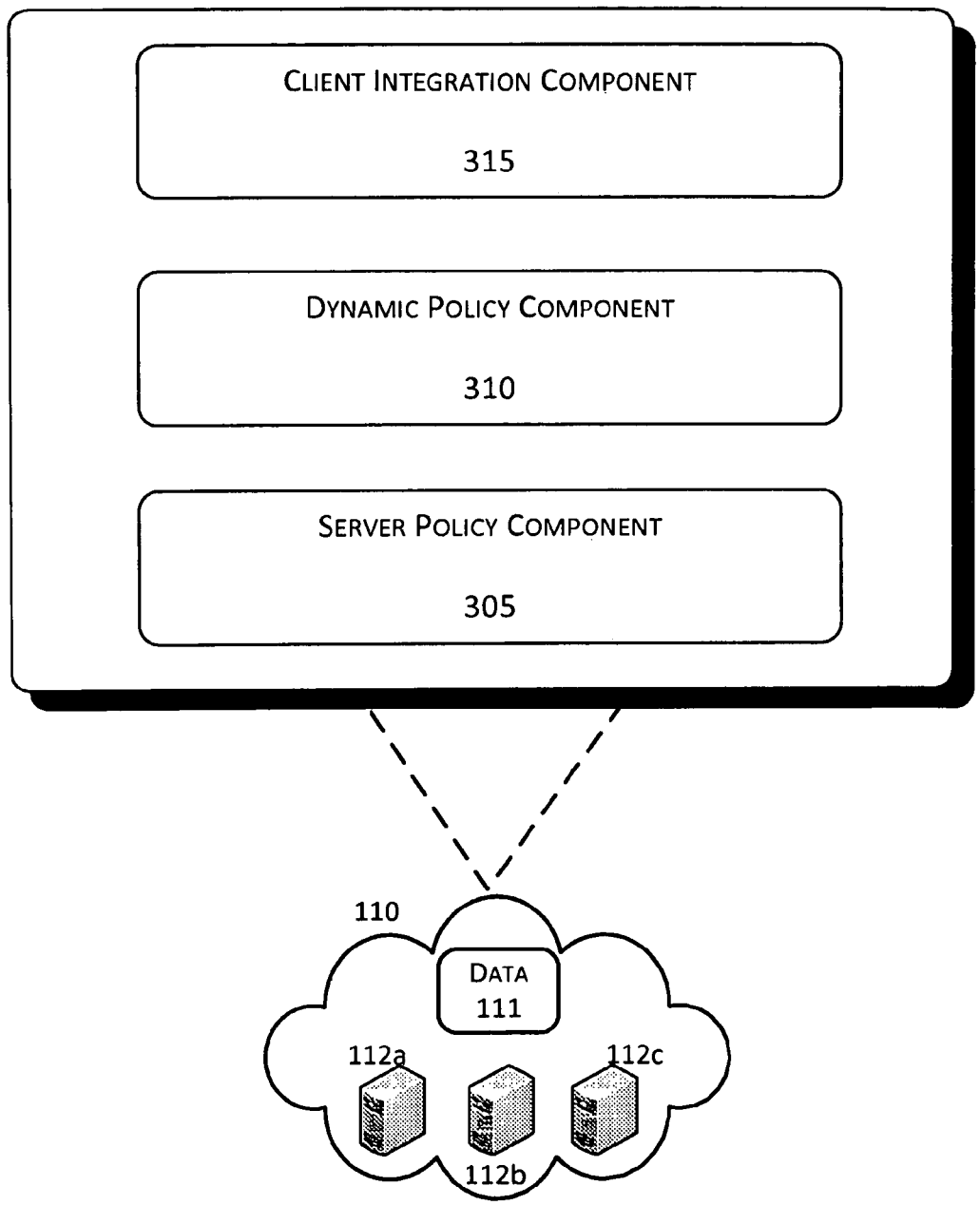
FIG. 3 shows an example configuration of a cloud-based service provider for implementing digital media privacy protection, arranged in accordance with at least some embodiments described herein.

FIG. 3 shows an example configuration 300 of a cloud-based service provider for implementing digital media privacy protection, arranged in accordance with at least some embodiments described herein. Configuration 300 may include various components or modules, e.g., implemented by one or more computer-readable media including but not limited to ASIC or CSIC, hosted on one or more of servers 112. The various components or modules may include, at least, a server policy component 305, a dynamic policy component 310, and a client integration component 315. Further, configuration 300 is not limited to such components or modules, as obvious modifications may be made by adding further components or modules or even eliminating at least one of the components or modules described here or even by having various components or modules assuming roles accorded to other components or modules in the following description.

Server policy component 305 may refer to a component or module that is configured, designed, and/or programmed to serve as a counterpart to policy component 225. Thus, server policy component 305 may access data 111, whether stored locally on a respective one of servers 112 or on client device 105. In accordance with various embodiments of digital media privacy protection, server policy component 305 may access permissions that grant full or partial/conditional permission to have corresponding digital media images captured by client device 105 rendered, i.e., stored, transferred, and/or shared with the facial image of the respective one of subjects 102 being unobfuscated. Alternatively, the server policy component 305 may access a prohibition, or denial, of such rendering of a corresponding digital media image.

Dynamic policy component 310 may refer to a component or module that is configured, designed, and/or programmed to integrate updates to permissions into data 111. That is, the permissions accessed by server policy component 305 are dynamic in nature, and any one of the permissions, whether full, conditional, or denied, may be changed by a respective one of subjects 102 using a corresponding client device or by having client device 105 transmit at least one updated permission to service/data provider 110 to thereby update data 111.

Client integration component 315 may refer to a component or module that is configured, designed, and/or programmed to synchronize any updates to data 111, which may be received from multiple sources, with policy component 225 on client device 105.

Accordingly, FIG. 3 shows configuration 300 that facilitates digital media privacy protection on service/data provider 110.

Figure 4:
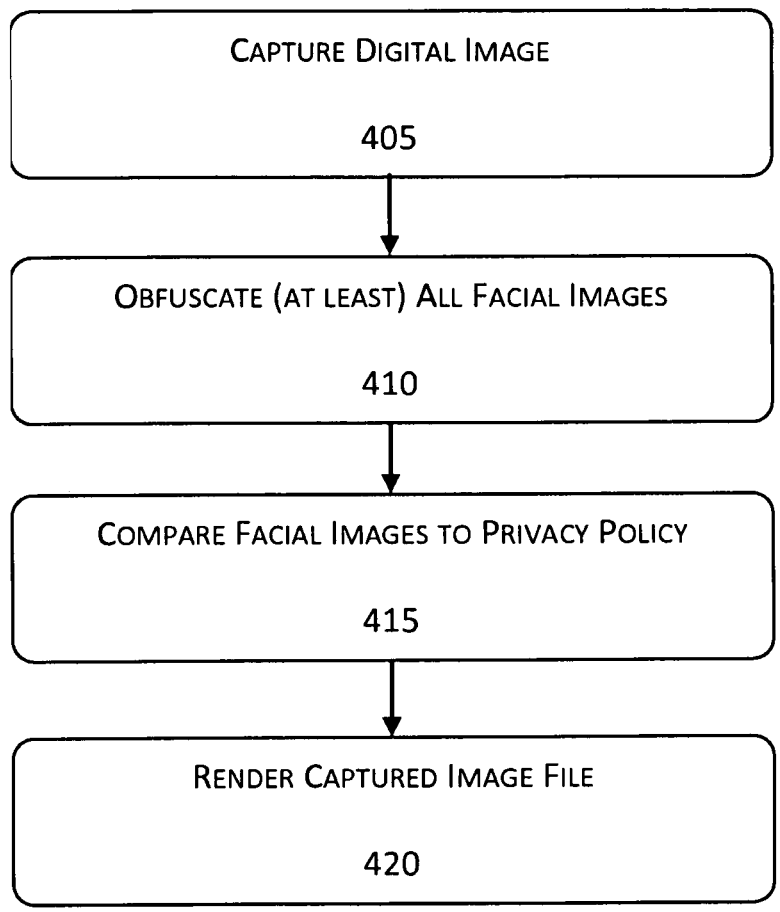
FIG. 4 shows an example processing flow for implementing digital media privacy protection, arranged in accordance with at least some embodiments described herein.

FIG. 4 shows an example processing flow 400 for implementing digital media privacy protection, arranged in accordance with at least some embodiments described herein. Processing flow 400 may include sub-processes executed by various components that are part of client device 105 and/or service/data provider 110. However, processing flow 400 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 405, 410, 415, and/or 420. Processing may begin at block 405.

Block 405 (Capture Digital Image) may refer to image capturing component 210 on client device 105 capturing at least one digital media file, including at least one still photograph and/or one or more video files, which may or may not include one or more of subjects 102. Processing may proceed from block 405 to block 410.

Block 410 (Obfuscate (at least) All Facial Images) may refer to obfuscation component 215 obfuscating, or otherwise blurring, at least all discernible facial images included in the one or more digital media files captured by image capturing component 210. As previously indicated, a discernible facial image may be any facial image within a still photograph or video image frame captured by image capturing component 210. Thus, any facial image in the one or more captured digital media files having discernible features may be obfuscated, or otherwise, blurred by obfuscation component 215. Further, in at least one embodiment, block 410 may also refer to the obfuscation or blurring of other features found in the one or more captured digital media files. Non-limiting examples of such features may include corporate logos, clothing brands or images, product placements, vulgar imagery, etc. Processing may proceed from block 410 to block 415.

Block 415 (Compare Facial Images to Privacy Policy) may refer to facial recognition component 220 discerning any facial image within the one or more digital media files captured by image capturing component 210 for comparison against facial images included in a locally stored database of facial images, i.e., data 111 as accessed by policy component 225. Facial recognition component 220 may recognize and compare the discernible facial images from the photograph or video image frame captured by image capturing component 210 before or in parallel with the obfuscation of the facial images included in the one or more captured digital media files by obfuscation component 215. Block 415 may further include policy component 225 accessing data 111 stored at client device 105 and/or service/data provider 110 to determine whether a particular facial image included in the captured particular photograph or video file that is discerned by facial recognition component 220 may be unobfuscated in view of the respective privacy policies for subjects 102. Processing may proceed from block 415 to block 420.

Block 420 (Render Captured Image File) may refer to rendering component 230, for those of subjects 102 who have granted permission within the context of the one or more captured digital media files, removing any restrictions configured to prevent a particular captured image from being stored locally on client device 105 and/or on servers 112 at service/data provider 110; removing any restrictions configured to prevent a particular captured image from being transmitted to another device or storage medium; and/or removing any restrictions configured to prevent a particular captured image from being uploaded to a cloud-based networking entity, e.g., a social networking service. Thus, block 420 may refer to rendering component 230 rendering the one or more captured digital media files with at least one unobfuscated facial image.

Thus, FIG. 4 shows an example process for protecting the privacy of subjects captured in a digital media file who have not granted permission to have their facial images stored or published in a public forum.

Figure 5:
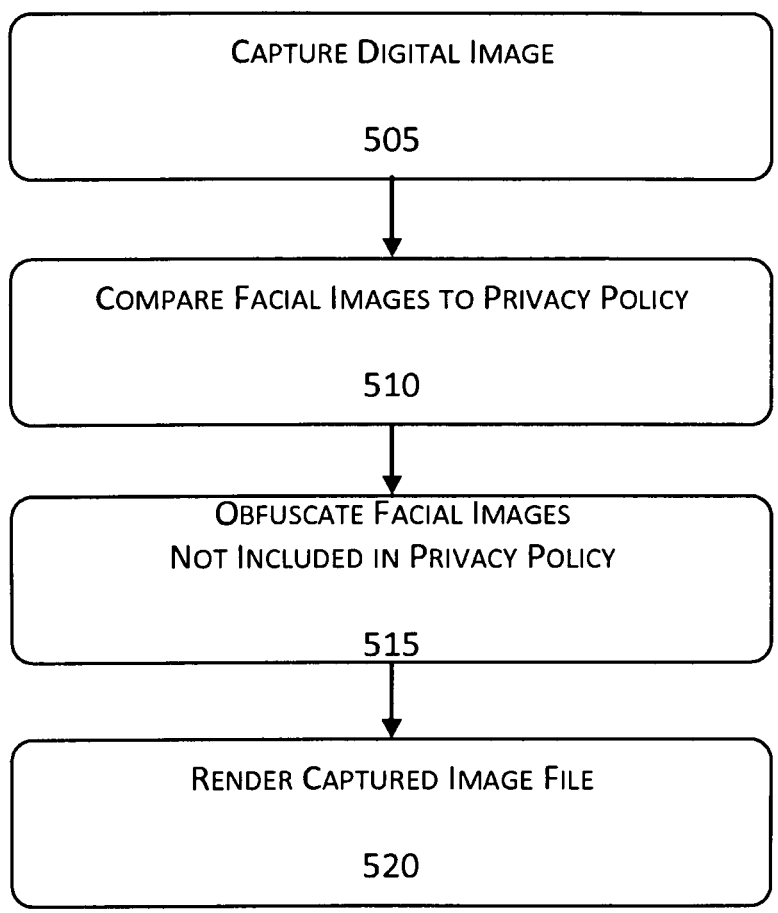
FIG. 5 shows an alternative example processing flow for implementing digital media privacy protection, arranged in accordance with at least some embodiments described herein.

FIG. 5 shows an alternative example processing flow 500 for implementing digital media privacy protection, arranged in accordance with at least some embodiments described herein. Processing flow 500 may include sub-processes executed by various components that are part of client device 105 and/or service/data provider 110. However, processing flow 500 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 505, 510, 515, and/or 520. Processing may begin at block 505.

Block 505 (Capture Digital Image) may refer to image capturing component 210 on client device 105 capturing at least one digital media file, including at least one still photograph and/or one or more video files, which may or may not include one or more of subjects 102. Processing may proceed from block 505 to block 510.

Block 510 (Compare Facial Images to Privacy Policy) may refer to facial recognition component 220 discerning any facial image within the one or more digital media files captured by image capturing component 210 for comparison against facial images included in a locally stored database of facial images, i.e., data 111 as accessed by policy component 225. Facial recognition component 220 may recognize and compare the discernible facial images from the photograph or video image frame captured by image capturing component 210. Block 415 may further include policy component 225 accessing data 111 stored at client device 105 and/or service/data provider 110 to determine whether a particular facial image included in the captured photograph or video file that is discerned by facial recognition component 220 corresponds to any of the affirmative, i.e., authorized, privacy policies for various ones of subjects 102. Processing may proceed from block 510 to block 515.

Block 515 (Obfuscate Facial Images Not Included in Privacy Policy) may refer to obfuscation component 215 obfuscating, or otherwise blurring, at least all discernible facial images included in the one or more digital media files captured by image capturing component 210 for which an affirmative, i.e., authorized privacy policy is not included in data 111. Thus, in accordance with one or more alternative embodiments of digital media privacy protection, any facial image in the one or more captured digital media files having discernible features may be unobfuscated until it is determined that there is no corresponding affirmative privacy policy. Processing may proceed from block 515 to block 520.

Block 520 (Render Captured Image File) may refer to rendering component 230 rendering the one or more captured digital media files with an unobfuscated facial image for each of subjects 102 for whom an affirmative privacy policy is included in data 111.

Thus, FIG. 5 shows an alternative example process for protecting the privacy of subjects captured in a digital media file by obfuscating those for whom authentication has not been actively granted.

Figure 6:
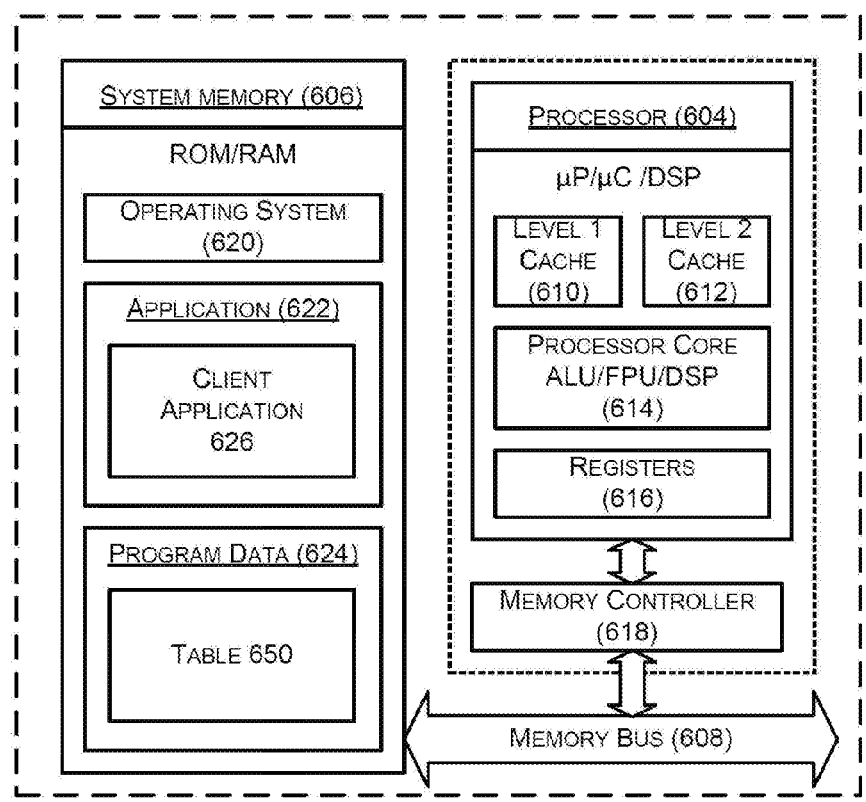
FIG. 6 shows a block diagram illustrating an example computing device by which various example solutions described herein may be implemented, arranged in accordance with at least some embodiments described herein.

FIG. 6 shows a block diagram illustrating an example computing device 600 by which various example solutions described herein may be implemented, arranged in accordance with at least some embodiments described herein.

More particularly, FIG. 6 shows an illustrative computing embodiment, in which any of the processes and sub-processes described herein may be implemented as computer-readable instructions stored on a computer-readable medium. The computer-readable instructions may, for example, be executed by a processor of a mobile unit, a network element, and/or any other computing device, particularly as applicable to the applications and/or programs described above corresponding to the configuration 100 for digital media privacy protection.

In a very basic configuration, computing device 600 may typically include one or more processors 604 and a system memory 606. A memory bus 608 may be used for communicating between processor 604 and system memory 606.

Depending on the desired configuration, processor 604 may be of any type including but not limited to a microprocessor ($\mu$P), a microcontroller ($\mu$C), a digital signal processor (DSP), or any combination thereof. Processor 604 may include one or more levels of caching, such as a level one cache 610 and a level two cache 612, a processor core 614, and registers 616. Processor core 614 may include an arithmetic logic unit (ALU), a floating point unit (FPU), a digital signal processing core (DSP Core), or any combination thereof. A memory controller 618 may also be used with processor 604; or in some implementations, memory controller 618 may be internal to processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may include, e.g., a client application 626, that may be arranged to perform the functions for digital media privacy protection, which are described previously with respect to FIGS. 1-4. Program data 624 may include a table 650, which may be useful for implementing actuation of appropriate components or modules as described herein. For example, table 650 may include catalog information regarding data stored in a local cloud-based service and data center, information regarding other cloud-based service and data centers associated with a particular cloud-based storage service, etc.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer-readable media as used herein may include both storage media and communication media.

Computing device 600, as described above, may be implemented as a portion of a small-form factor portable (or mobile) electronic device such as mobile client or, alternatively, a personal data assistant (PDA), a personal media player device, a personal headset device, an application specific device, or a hybrid device that include any of the above functions. Computing device 600 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies, described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via ASICs, Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors, such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A non-transitory computer-readable medium storing computer-executable instructions that, in response to being executed, cause one or more processors to execute operations comprising:

capturing, by an image capturing device, an image file;

obfuscating, by the image capturing device, facial images included in the captured image file;

comparing, by the image capturing device, the facial images included in the captured image file against a privacy policy including permissions locally stored on the image capturing device, the privacy policy including one or more of: names and one or more distinguishing characteristics, for at least one person who has provided conditions upon which a captured image may be rendered, wherein the privacy policy is updated by a remote server, wherein the permissions include conditions under which an image for a particular person may be rendered by the image capturing device on which the computer-readable medium is hosted, and wherein the conditions include at least one of a geographical location and a time setting;

unobfuscating, by the image capturing device, those of the facial images included in the captured image file for which the comparison against the locally stored privacy policy results in a positive match; and rendering, by the image capturing device, the captured image file.

2. The non-transitory computer-readable medium of claim 1, wherein the computer-readable medium is hosted on an image capturing device.

3. The non-transitory computer-readable medium of claim 1, wherein the image file includes a digital photograph.

4. The non-transitory computer-readable medium of claim 1, wherein the image file includes a digital video file.

5. The non-transitory computer-readable medium of claim 1, wherein the privacy policy includes one or more of: names, permissions, and one or more distinguishing characteristics for at least one person for whom at least a facial image is recognizable by the image capturing device on which the computer-readable medium is hosted.

6. The non-transitory computer-readable medium of claim 1, wherein the privacy policy is dynamic.

7. The non-transitory computer-readable medium of claim 1, wherein the operation to render the captured image file includes removing a restriction configured to prevent the captured image file from being stored.

8. The non-transitory computer-readable medium of claim 1, wherein the operation to render the captured image file includes removing a restriction configured to prevent the captured image file from being transmitted to another device or storage medium.

9. The non-transitory computer-readable medium of claim 1, wherein the operation to render the captured image file includes removing a restriction configured to prevent the captured image file from being uploaded to a cloud-based networking entity.

10. The non-transitory computer-readable medium of claim 1, wherein the operation to obfuscate includes obfuscating predetermined objects.

11. An image capturing device, comprising:

an image capturing component configured to capture an image file;

a policy component configured to:

access a dynamic privacy policy, hosted at a server, that identifies:

a facial image for one or more individuals who have consented to being identifiable in captured media, and permissions for one or more individuals who have consented to being identifiable in the captured media, wherein the dynamic privacy policy includes one or more of: names and one or more distinguishing characteristics for the one or more individuals who have consented to being identifiable in the captured media, wherein the dynamic privacy policy includes conditions under which an image for the one or more consenting individuals may be rendered by the image capturing device, and wherein the conditions include at least one of location and time;

a facial recognition component configured to compare each facial image included in a captured image file against the dynamic privacy policy; and an image rendering component configured to render the captured image file with all facial images included therein obfuscated but for those of the individuals whose consent is included in the dynamic privacy policy.

12. The image-capturing device of claim 11, wherein the image capturing device is capable of capturing digital photographs and digital video files.

13. A method, comprising:

capturing, by an image-capturing device, an image in a digital image file;

blurring, by the image-capturing device, facial images included in the digital image file for those subjects for whom permission to publish a corresponding facial image is not included in a locally accessible privacy policy, the privacy policy updated by a remote server and includes permissions, wherein the privacy policy includes one or more of: names and one or more distinguishing characteristics for one or more potential subjects for whom an image may be captured in a present context, wherein the locally accessible privacy policy includes conditions under which an image for a consenting subject may be rendered by the image capturing device, and wherein the conditions include at least one of location and time; and rendering, by the image-capturing device, the digital image file.

14. The method of claim 13, wherein the rendering the digital image file includes at least one of:

storing the digital image file, and publishing the digital image file.

15. The non-transitory computer-readable medium of claim 1, wherein the conditions upon which the captured image may be rendered for the at least one person is provided prior to the capturing the at least one image file.

16. The non-transitory computer-readable medium of claim 1, further comprising updating the privacy policy with an updated permission for the at least one person who has provided the conditions upon which the captured image may be rendered.

* * * * *

UNITED STATES PATENT AND TRADEMARK OFFICE
CERTIFICATE OF CORRECTION

PATENT NO.        : 9,298,931 B2                              Page 1 of 1
APPLICATION NO.   : 13/882491
DATED             : March 29, 2016
INVENTOR(S)       : Ur et al.

It is certified that error appears in the above-identified patent and that said Letters Patent is hereby corrected as shown below:

Specification

In Column 1, Line 7, delete "§371" and insert -- § 371 --, therefor.

In Column 2, Line 55, delete "over, client" and insert -- over client --, therefor.

In Column 3, Line 37, delete "to an," and insert -- to an --, therefor.

In Column 6, Line 4, delete "digital media," and insert -- digital media --, therefor.

In Column 6, Line 25, delete "apply to," and insert -- apply to --, therefor.

In Column 11, Line 31, delete "technologies," and insert -- technologies --, therefor.

In Column 12, Lines 23-24, delete "processors," and insert -- processors --, therefor.

Signed and Sealed this
Fourteenth Day of June, 2016

Michelle K. Lee
*Director of the United States Patent and Trademark Office*